United States Patent [19]

Plumb et al.

[11] Patent Number: 4,655,667
[45] Date of Patent: Apr. 7, 1987

[54] HARVESTING APPARATUS HAVING DETACHABLE WINGS

[75] Inventors: Bruce E. Plumb; C. Dal Freeman, both of Salinas, Calif.

[73] Assignee: Bud Antle, Inc., Salinas, Calif.

[21] Appl. No.: 675,094

[22] Filed: Nov. 26, 1984

[51] Int. Cl.[4] ............................................. B60P 1/52
[52] U.S. Cl. ................................. 414/343; 180/89.12; 180/141; 296/190; 414/353; 414/401; 414/501; 414/535
[58] Field of Search ............... 414/343, 340, 341, 349, 414/353, 396, 398, 401, 497, 507, 508, 501, 521, 532, 535, 541, 584; 296/181, 183, 190, 194; 180/89.12, 89.13, 141; 280/403

[56] References Cited

U.S. PATENT DOCUMENTS

| | | | |
|---|---|---|---|
| 3,006,492 | 10/1961 | Haughton | 280/403 X |
| 3,073,466 | 1/1963 | Greer et al. | 414/343 X |
| 3,147,868 | 9/1964 | Borger et al. | 414/343 |
| 3,489,300 | 1/1970 | McCartney et al. | 414/343 X |
| 3,506,144 | 4/1970 | Carder et al. | 414/343 |
| 3,604,576 | 9/1971 | Poccard | 414/501 X |
| 3,837,508 | 9/1974 | Stefanelli | 414/343 X |
| 4,065,167 | 12/1977 | Wright | 296/190 |
| 4,275,800 | 6/1981 | Batzel | 180/89.13 X |
| 4,292,784 | 10/1981 | Abatti et al. | 414/345 X |
| 4,303,258 | 12/1981 | Davis | 280/403 |
| 4,306,830 | 12/1981 | le Duc | 414/343 |

Primary Examiner—Robert J. Spar
Assistant Examiner—David A. Bucci
Attorney, Agent, or Firm—Townsend and Townsend

[57] ABSTRACT

A harvesting system for wet soil crops, such as broccoli and cauliflower, includes a harvest/shuttle vehicle and complementary trailer. The vehicle may be operated in a harvest mode in concert with detachable harvesting wings to accumulate a load of produce during a harvest. Thereafter, the harvest vehicle may either transfer the load to a similar vehicle used in a shuttle mode to transport the load to the highway, or the wings may be detached from the vehicle and the vehicle may be operated in the shuttle mode to transport the load to the highway. In either application, the harvest remains uninterrupted because the harvesting wings continue to remain in use in the field. After a load is transported from the field to the highway, it is readily transferred to a trailer. The trailer includes a trailer bed that is readily adjusted between a load receiving elevation and a load transporting elevation. All such transfers between harvester, shuttle, and trailer are automated using palletized loads and self-powered transfer mechanisms.

7 Claims, 14 Drawing Figures

HARVESTING APPARATUS HAVING DETACHABLE WINGS

BACKGROUND OF THE INVENTION

1. Field of the Invention

The present invention relates to agricultural machinery. More particularly, the present invention relates to an apparatus for the harvesting, loading, and transfer of produce.

2. Description of the Prior Art

With the advent of agricultural mechanization, broccoli, cauliflower, and other crops requiring damp growing conditions, have been difficult to harvest. The conditions that promote high yields of these crops —extremely moist soil conditions—exacerbate the harvesting process. Nonstandard cultivation techniques, such as varying row spacings, also reduce the efficiency with which broccoli, cauliflower, et al. can be harvested.

The known and widely practiced technique of harvesting such produce requires that a team of laborers proceed through a field ahead of a harvesting machine cutting the product from the plant on which it grew. A second team of laborers, accompanying a harvest machine, gather the product, and load it onto the harvest machine.

The typical harvest machine may be of a type particularly adapted for working in wet fields where the tires of the machine may sink thirty inches or more into mud when fully loaded. Such machines are most often towed through the field by a team of tractors. Once a harvest machine is loaded to capacity, the machine is towed from the field and the harvest machine used as a highway transport vehicle. The harvest machine is typically unloaded at a cooling facility and then returned to the field for the harvest of another load of produce.

It is known to have had vehicles in the field off-load produce that has been sorted into cartons and palletized. Heretofore, such harvesters have directly discharged to vehicles which travel from the harvesting site in the field to the cooling and shipping facilities and thence to market.

Vehicles which are capable of traveling on the road and in the field are compromise vehicles having deficiencies in the field or on the road. This is especially true where the field is muddy or mired and the vehicle tires are designed for mud and mire, but not for road travel. Typically, the specialized vehicles for making the transit of such fields are too slow for travel over appreciable distances to processing and/or transporting locations. Moreover, where the crop is one that is indigenous to mud, travel of such vehicles on conventional roads without cleaning is often not permitted.

Moreover, the conveyance between the vehicles which are capable of road travel and the harvesting vehicles has consisted of sliding ramps. Typically, the road vehicle is provided with a winch. When the road vehicle is abutted to the harvest vehicle with the ramps spanning the distance therebetween, cargo is pulled by the winch to the road transport vehicles.

Passing pallets stacked 14 cartons high over ramps can result in the load being in part lost. Moreover, utilizing winches requires that the pallet be placed on special fittings to convey the load. In short the apparatus and process of the prior art is ungainly and inadequate where special field conditions such as mud and the like are commonly encountered.

SUMMARY OF THE INVENTION

The present invention provides a harvesting vehicle operable as both a field harvester in conjunction with harvesting wings, and as a transfer or shuttle vehicle. Accordingly, a system is provided for maximizing the efficiency with which equipment and labor are used.

The vehicle may be fitted with harvesting wings during the harvest process. Produce is boxed on the wings and the boxed produce is then loaded onto pallets on a vehicle deck. The vehicle deck includes a bi-directional chain-drive mechanism for transferring loaded pallets toward the front portion of the deck to make space for additional pallets at the loading end of the vehicle.

When the shuttle vehicle is equipped with harvesting wings, the harvesting wings are pivotally mounted to a wing base portion. The wings move for operation between a parallel alignment with the sides of the vehicle for transport with the vehicle, and a perpendicular alignment with the vehicle for loading operations.

When the vehicle is utilized as a harvester, it is capable of accommodating all kinds of harvesting apparatus. For example, harvesting "wings" of various kinds are usually attached to the vehicle. These wings can be permanently attached to the vehicle, can be removably attached to the vehicle, or as illustrated herein, can be configured for field detachment to and from the vehicle.

When operated as a shuttle, the vehicle may either carry the wings in a folded configuration or the wings may be detached from the vehicle. The vehicle is self-powered in both the harvesting and shuttle mode of operation. During the shuttle mode of operation, a deck hatch is removed to provide an operator cab including steering, braking, and speed controls. Such controls are also provided at various points about the vehicle for operation by field personnel during the harvest mode of operation.

An important aspect of the vehicle disclosed is that it is provided with a self-leveling feature. Paired, individually steerable axles are independently mounted at central trunions to the underside of the vehicle. The vehicle platform tilt with respect to these mounting trunions is controlled by hydraulic cylinders actuated by a pendulum control. Leveling of the vehicle in carrying high palletized loads and disposing harvesting wings of long span with respect to the ground is achieved.

The vehicle is provided with the capability of receiving or discharging loads at both ends. When used as a harvest vehicle, loads are typically discharged over the forward end of the vehicle. When used as a shuttle, loads are received and the rear end of the vehicle and typically discharged to a transporting trailer at the front end of the vehicle.

The specific method used for cargo discharge consists of an exposed pair of inboard chains and outboard supporting wheels. Typically, a load can be moved and transferred using friction between conventional pallets and the exposed chains. Alternately, a fitting affixed to the chain can assist load transfer.

A highway transport trailer is provided by the present invention. The shuttle vehicle is operated to transfer the palletized load onto the trailer bed. The trailer bed includes a series of wheels along an upper trailer bed surface across which the load may readily be moved without the need of additional drive such as that supplied by the shuttle vehicle. Once the load is received at the trailer, the load is secured for highway transport.

An important aspect of the invention is the versatility of the system provided. In a large operation, several vehicles may be used as self-propelled harvest vehicles. Such vehicles are particularly adapted for use in fields where significant moisture is required by the crop and, accordingly, where deep mud is encountered. An additional vehicle is operated continuously in a shuttle mode. As the harvesting vehicles become fully loaded, the shuttle vehicle is engaged with the loaded harvest vehicles one at a time by passive engagement of a shuttle vehicle socket with a harvest vehicle horn. The load is transferred to the shuttle vehicle, and the shuttle vehicle moves the load from the field, to the highway, and thereafter transfers it to the trailer. This process is repeated for each of the harvest vehicles in the field such that all equipment is continually in use and all laborers are fully employed at all times during the harvest process.

Another such harvest technique involving several harvesters uses the shuttle vehicle to remove a portion of the load from each of the harvester vehicles along a collection route. The load is then transferred to a trailer, after which the shuttle repeats its route. The trailer can rapidly accumulate a load for immediate transport and cooling, and avoid initial post harvest deterioration, especially on hot harvest days.

The present invention is a versatile harvesting system and method involving a novel and unique harvest/shuttle vehicle and highway trailer. The abundance of variations and configurations of the present invention allows it to be adapted to almost any harvest situation from a small family farm to a large corporate farming concern.

DESCRIPTION OF A PREFERRED EMBODIMENT

The present invention is a harvesting system including a dual purpose harvest/shuttle vehicle and a load receiving trailer having a elevatable bed. A vehicle 10 is shown, in FIG. 1a during a harvesting sequence in field 12, which includes a series of rows 13 along which a crop is planted. Vehicle 10 is self-propelled for movement through field 12 on wheels 15, which are of a large diameter. Such large diameter wheels are necessary because the invention is intended primarily for use in fields where moisture is a necessary element of successful crop production. Such fields become quite muddy, the wheels sometimes sinking into the mud up to thirty inches. Tire width is restricted because of row spacing and cannot be changed to avoid wheel sinking.

Figure 1A:
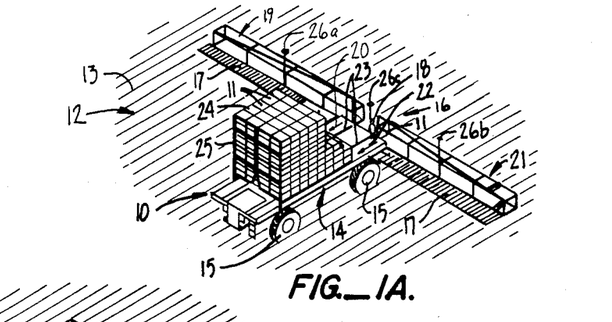
FIGS. 1a-1d are perspective views of the present invention during a harvesting sequence.

Vehicle 10 includes a self-propelled loading portion 14 and a detachable wing assembly 16. A product, such as broccoli or cauliflower, is severed from the plant on which it was grown by a first field team. As shown here, the product is sorted and crated in cartons for cooling and shipping on detachable wings 19 and 21. The wings serve to convey the product from the field to the central packing station contained on the vehicle deck 22.

As the vehicle moves through the field, the series of boxes 11 assembled on pallet 20 form load 24. The product is loaded onto left wing and right wing portions 19 and 21, respectively, and moved along conveyor 17 at each wing portion to a loading station 11. At loading station 11, field personnel 18 place the harvested product onto a pallet 20 on vehicle deck 22. As a pallet is filled to capacity with loaded boxes, it is moved forward on vehicle deck 22 by a series of bidirectional chain drives 23. Excess forward movement of the load along the deck is prevented by a retaining fence 25 which maintains the load securely in place during vehicle motion.

Figure 5:
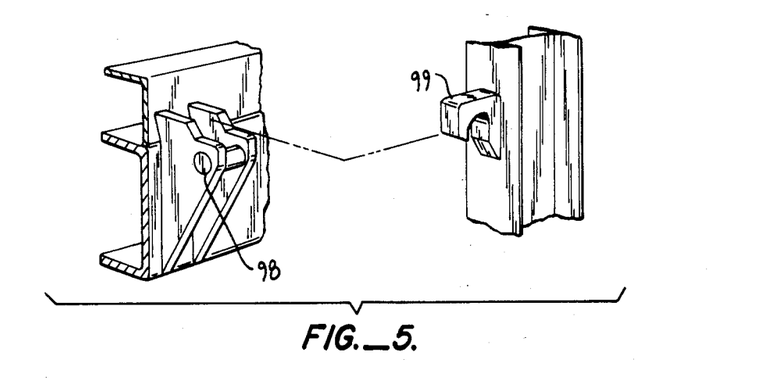
FIG. 5 is a perspective detail of a hook and wing bracket according to the present invention.

The reader will understand that the harvest vehicle of this invention may be equipped with any number of harvesting accessories. For example, an alternate harvesting accessory is illustrated at FIG. 5, Plumb et al. pending U.S. Patent Application Ser. No. 675,096 for Method And Apparatus For Harvesting Stemmed Vegetables filed Nov. 26, 1984. In this apparatus, individually conveyed cups receive the product as it is picked in the field and all wrapping, sorting, packing and palletizing occurs on the deck of the harvesting vehicle. The harvesting wings represented by this apparatus are typically removably detachable from the vehicle and do not include the field detachment feature illustrated herein.

Once a load is accumulated on vehicle deck 22, a shuttle vehicle 28 (FIG. 1b) may be brought into alignment with the harvesting vehicle and the load transferred therebetween. Retaining fence 25 is a swinging door arrangement including right and left sections 27a and 27b. Shuttle vehicle 28 is identical to harvest vehicle 10 including wheels 34, retaining fence 31, a deck surface 29, and a bi-directional chain drive 30. The bi-directional chain drive of shuttle vehicle 28 cooperates with that of harvest vehicle 10 during transfer of the load between the two vehicles.

Figures 1B, 1C, 1D:
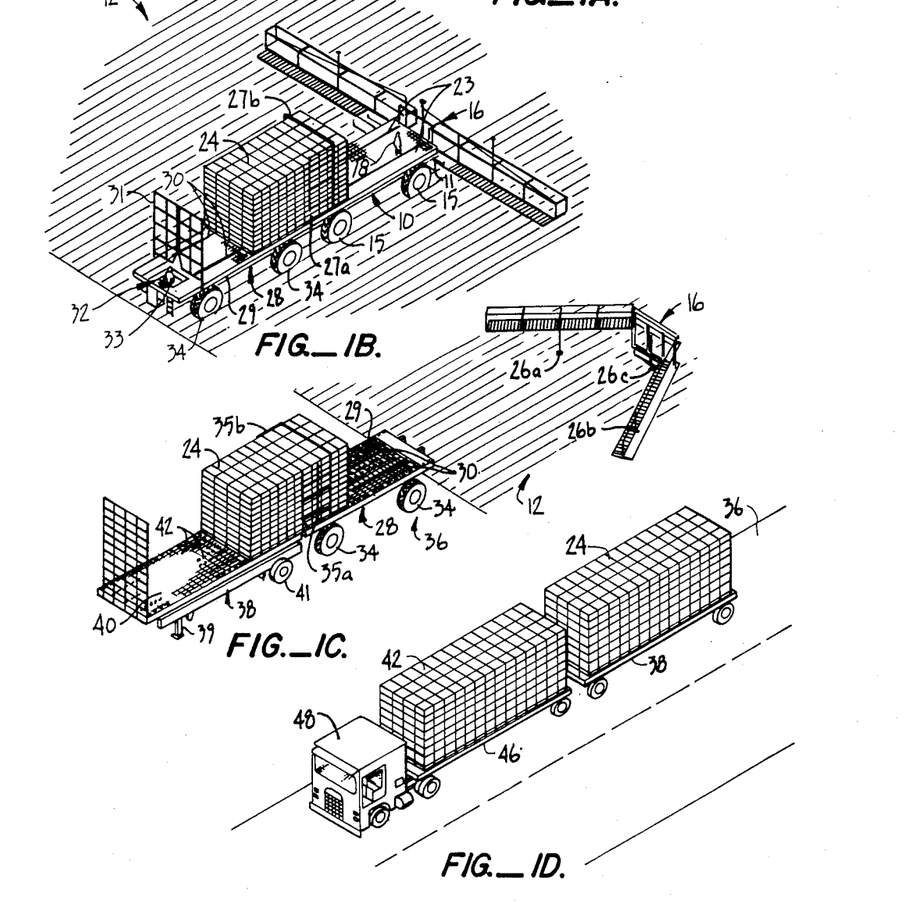

While the load is being transferred from harvest vehicle 10 to shuttle vehicle 28, vehicle wings 16 can continue to be used to load deck 22 of harvest vehicle 10. Each vehicle includes a cab portion, shown as cab 32 on shuttle vehicle 28, in which a driver 33 may sit. When the vehicle is operated as a shuttle (as opposed to a harvester), a driver occupies the cab to control steering, acceleration, and braking of the vehicle.

Once the load is fully transferred to shuttle vehicle 28, the shuttle vehicle is driven from the field to the highway. An illustration of highway transfer of the load from the shuttle vehicle to a trailer is shown in FIG. 1c. The embodiment of the invention shown in FIG. 1c provides a single vehicle 28 operated as a shuttle and as a harvester. Wings 16 are left in the field supported in a tripod fashion on stands 26a–26c to allow field personnel to continue loading the product into boxes arranged along the wings while the vehicle is operated as a shuttle to transfer the load to the highway. The vehicle is shown at highway 36. A trailer 38 receives the load from vehicle 28 and thereafter transfers it to a processing plant.

The load 24 is transferred through right and left gate portions 35a/35b of retaining fence 31 by chain drive 30. The load is moved along a trailer bed 40 on rollers 42. Load transfer energy is supplied by the shuttle vehicle chain drives—the preferred embodiment of the invention does not include a powered transfer mechanism along the trailer bed. Rather, loaded pallets being transferred from vehicle 28 are pushed across the trailer bed by the pallets directly following until the last pallet has been transferred.

As has been previously set forth, wheels 34 (and 15) are of a large size to provide the vehicle with significant elevation for maneuvering through muddy fields. Generally, a trailer is not able to directly receive a load at such elevation. Trailer 38 is provided with a mechanism for elevating it above a transport elevation to align bed 40 with deck 29 and allow the trailer to receive load 24 from the vehicle.

Trailer 38 includes a rear wheel set 41 and a front landing gear 39. Such arrangement is not necessary and wheels may be provided at both ends of the trailer, if desired. A tractor 48 pulling trailers 38 and 46 along highway 36 is shown in FIG. 1d. A tractor can pull two loads 24 and 42 or more, if permissible and if desired.

In summary, the system operates as follows: An agricultural product, such as broccoli or cauliflower, is gathered in a field, loaded into boxes, and transferred along a harvest wing to a pallet on a harvest vehicle deck. When the harvest vehicle deck is fully loaded with box-laden pallets, the load is moved from the field to a highway by either (a) transferring the load to a shuttle vehicle and then shuttling the load from the field to the highway with the shuttle vehicle, or (b) removing the wing assembly from harvest vehicle (thereby allowing the harvest to continue uninterrupted) and shuttling the load from the field to the highway with the harvest vehicle, which is now operated as a shuttle vehicle. Once the load is transported to the highway, it is preferably transferred to a unique trailer having an elevatable bed. When the transfer is complete, the trailer bed is lowered and the trailer is transported by a tractor to a processing plant. The shuttle vehicle is returned to the field to either pick up another load from a harvesting vehicle, or to accumulate another load from the harvest wings.

Figures 2, 4:
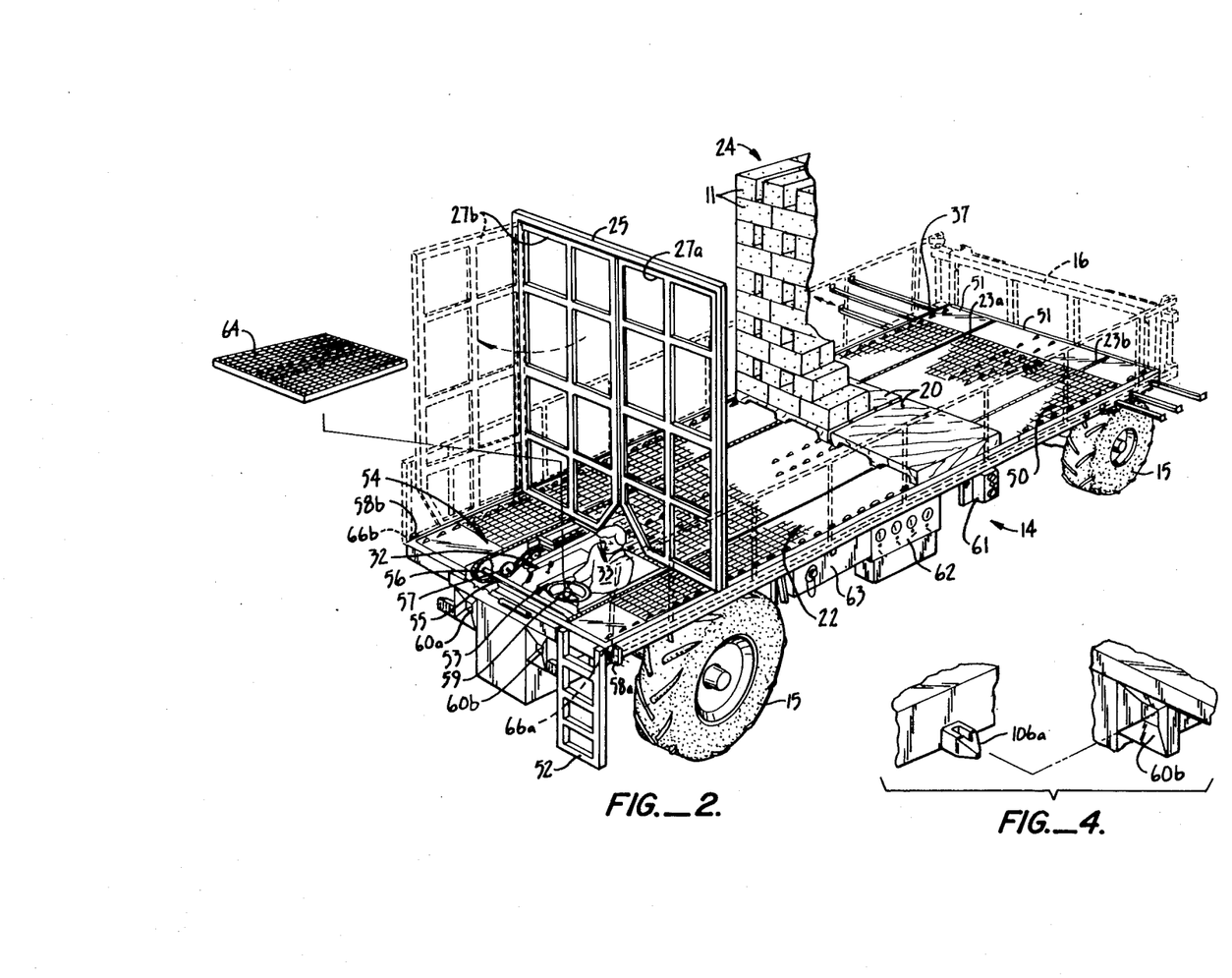
FIG. 2 is an overall perspective view of the present invention in operation as a shuttle vehicle.
FIG. 4 is a perspective detail of vehicle horn and socket assemblies according to the present invention.

A perspective view of vehicle 14, operated in a shuttle mode, is shown in FIG. 2. Wing assembly 16 is shown in phantom, the wing portions folded with a parallel orientation to the shuttle vehicle, and having wing tips 66a and 66b held securely to the vehicle within saddle assemblies 58a and 58b. In the preferred embodiment, the wings are only folded to the vehicle, as shown in phantom, when transporting the wing assembly to and from a field. However, such configuration could be used in all phases of vehicle operation. One unique and important aspect of the invention is that when the wings are folded to the vehicle and secured within saddles 66a and 66b, the vehicle width remains within legal vehicle width limits for highway operation.

Figure 6:
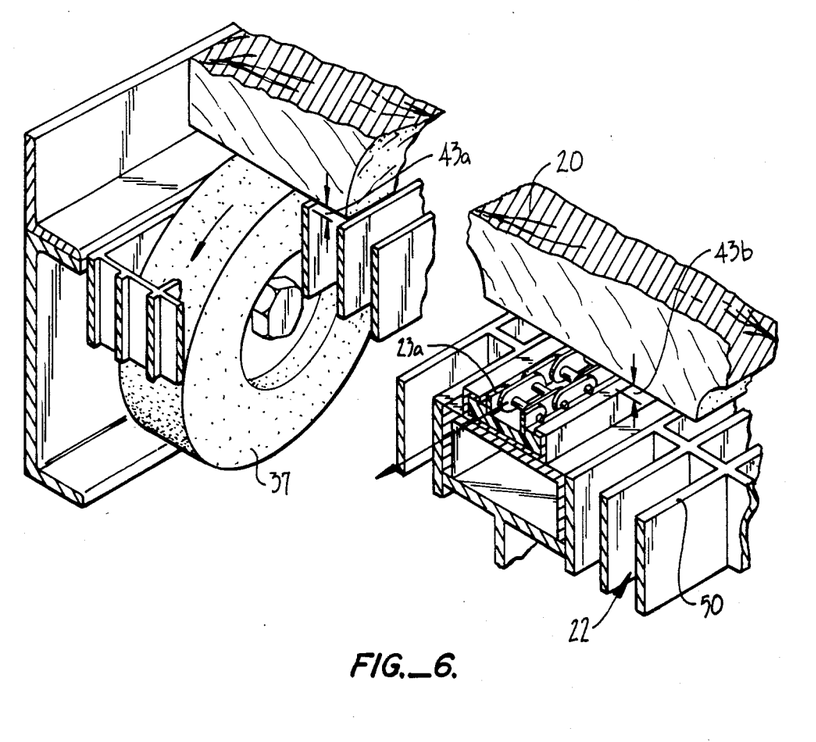
FIG. 6 is a perspective cutaway detail of a vehicle deck according to the present invention.

Vehicle 14 is shown carrying a load 24, consisting of produce-containing boxes 11 carried on pallets 20. The pallets are moved along a vehicle deck 22 by chain drive 23. A detail of a portion of chain drive 23 drive mechanism 54 is shown as a partial cutaway (and also shown in FIG. 3 and in cross-section in FIG. 6), including a drive axle 55, a drive sprocket 56, and a follower wheel 57. The preferred embodiment of the invention provides a motive source 104 (FIG. 3) at each end of the vehicle, one for each direction of chain operation. The redundant drive arrangement is provided to allow load 24 to be moved in either direction along the vehicle deck—it is generally not possible to push a load-bearing chain.

A ladder 52 is provided to allow an operator 33 to enter cab 32. A full complement of controls 53 are provided, including a steering wheel 59 and various other controls, such as a throttle and a brake (not shown). When the vehicle is operated as a harvester, a hatch 64 covers cab 32 and thus allows the transfer of loaded pallets across that portion of the vehicle; for example when a load transfer is made from a harvest vehicle to a shuttle vehicle or trailer.

Load 24 is maintained in position during transit and prevented from shifting onto operator 33 by retaining fence 25 which includes two swinging gate portions 27a and 27b. Deck 22 is preferably formed from a grate material 50 and may include rows of wheels 51 (also, FIG. 6) to assist during transit of the loaded pallets across the vehicle deck. A set of outboard controls 61 is provided along a vehicle side portion. Controls 61 are provided on either side of the vehicle as well as at the rear portion thereof to allow the vehicle to be steered, stopped, and driven as is necessary and in accordance with field conditions and work rates while the vehicle is operated as a harvester.

Engine controls 62 are also shown. The preferred embodiment of vehicle is driven by a diesel engine (not shown); a fuel tank 63 contains a supply of diesel fuel. A preferred drive mechanism (not shown) uses the diesel engine to operate a hydraulic pump which, in turn, operates a series of hydraulic motors and actuators. Such hydraulic systems are well known in the art and are not discussed in detail herein. Likewise, a yoke shaped live axle may be provided for each wheel assembly to transfer drive power to all four wheels 15. Such axle assemblies are known in the art and are particularly useful in fields where clearance beneath a vehicle is a critical factor. The conditions encountered by the present invention during a harvest in muddy fields provide an appropriate application for these known drive mechanisms. This is especially true when considering that the wheels may sometimes sink into the mud to a depth of up to thirty inches.

The wheels themselves are lugged and are of a type readily available and in use for such applications as harvesting vehicles operated in rice fields. The wheels may include row width adaptors of the type known in the art that allow the vehicle to be readily used in fields of varying row widths without the risk of damaging a planted row. Such adapters operate to vary the side-to-side wheel spacing and, thus, accommodate various crop row widths. Also included, but not shown, are various known safety features, such as an emergency stop switch. Generally, such switches are located at several points about the machine, including along the wings. In the event that an emergency situation occurs, the emergency stop switch is operated to immediately stop the vehicle.

A pair of gathering surfaces, such as sockets 60a and 60b are provided, as shown at a front portion of vehicle 14 (also shown in detail in FIG. 4 as 60b). These surfaces receive mating projections or horns 106a (FIG. 4) to allow proper alignment (side-to-side and elevation) between a load-transferring vehicle and a load-receiving vehicle.

Figure 3:
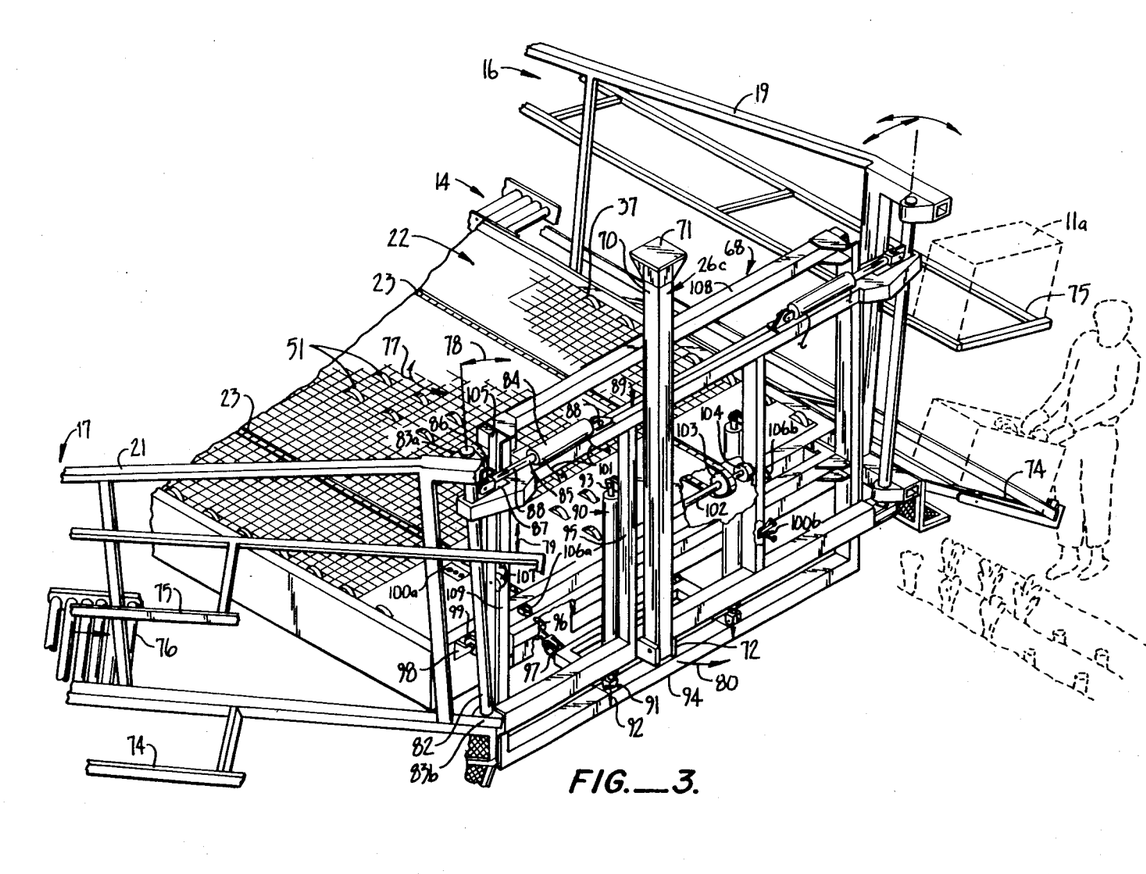
FIG. 3 is a perspective view of a rear portion of the vehicle showing a harvest wing base and associated control assemblies.

A perspective assembly view of a rear portion of vehicle 14 and wing assembly 16 base portion 68 is shown in FIG. 3. Right and left wing portions 21 and 19 are symmetrical; the various actuators and components that operate the wing portions are identical for each wing portion. Accordingly, the discussion herein is limited to those components of right wing portion 21 as is shown in FIG. 3. Unless otherwise pointed out below, left wing portion 19 includes identical actuator components performing identical functions in an identical manner as for wing portion 21.

Wing portions 19 and 21 are shown in a partially folded position in FIG. 3. This is done to make the illustration more complete. Generally, the wing portions are unfolded to an orientation substantially perpendicular to the vehicle during a harvest. Each wing portion provides three work surfaces:

(1) A folding rack 75 to provide a surface along which empty boxes (11a in phantom) are placed.

(2) A folding work station rack 74; and (3) A folding conveyor 17.

Workers gathering the crop place the product in boxes on rack 74. When the box is filled, it is lifted to conveyor 17, which provides a roller surface 76. There may be a slight tilt to conveyor 17 that allows the force of gravity to carry the box toward wing assembly base portion 68 (or the conveyor may be powered). Thereafter, the box is loaded onto the vehicle deck as described above. As the harvest progresses and a box is filled, an empty box is taken from rack 75 and placed on rack 74 and the procedure is repeated.

Racks 74 and 75, and conveyor 17 are all hinged so that they may be folded to allow the wings to be transported by the vehicle. In this way the width of the vehicle when carrying the wings is reduced and the vehicle may be legally operated on the highway.

The wings are adjustable in any of four dimensions as follows:

(1) Pivot: The wings may be pivoted between a folded position and a harvest position as indicated by arrow 77. Such pivoting occurs on pivot points 83a and 83b along shaft 82.

(2) Rake: The rake of the wings may be adjusted as indicated by arrow 78. Shaft 82 is connected through a coupling 86 to a piston 85. Piston 85 is movable, as indicated by arrow 88, within cylinder 84, which is operated through hydraulic lines 101. Cylinder 84 is secured by a fastening 86 which is in turn secured to frame cross rail 89. Operation of cylinder 84 causes piston 85 to push or pull shaft 82 within slot 87 and thus affect the rake of the associated wing portion. This mechanism is identical for both wings. It is desirable to adjust rake in fields where there may be some slope. For example, it is possible that a field may slope such that the tip of a wing portion touches or drags along the ground. The rake adjustment elevates the wing portion to prevent such ground contact. In a like manner, in some fields a wing portion may be lifted from the ground further than optimum. Again, the rake adjustment may be used to lower the wing portion to a proper height from the ground. Rake is adjusted independently for each wing portion.

(3) Elevation: The elevation of the wing assembly from the ground may be adjusted as indicated by arrow 79. The mechanism that adjusts wing assembly elevation is located at assembly base portion 68. The preferred mechanism is a fork lift conveyor. Such mechanisms are well known and provide a channel 105 including an outer shell 109 and a wheel 107 (shown in cutaway). Channel 109 is integral with frame 108. The wing portions are movable in relation to frame 108 and are integral with shell 109. Movement between channel 105 and shell 109 is damped by wheel 107. Elevation is controlled by a cylinder 90 including a coupling point 93 by which a bias is asserted against a wing base assembly cross member 95.

When cylinder 90 is actuated, a piston 91 moves in a direction indicated by arrow 92. Frame 108 includes a bottom rail 94 against which force is exerted by piston 91 when cylinder 90 is actuated. Because rail 94 is secured to the vehicle and is therefore immovable, the entire movable portion of the wing assembly is lifted in relation to the vehicle.

Two such cylinder and fork lift conveyors are provided. Unlike the rake and pivot adjustments which may be made independently on each wing member, elevation is adjusted for both wing portions simultaneously. The elevation adjustment is provided for two purposes: (1) to provide proper clearance of the wing tip portions from the ground during harvesting or when being carried in saddles 58a and 58b; and (2) to facilitate removal of the wing assembly from the vehicle.

Removal of the wing assembly from the vehicle is as follows: The throw of piston 91 allows it to be extended to push against rail 94 to raise the wing assembly or to be retracted to pull against rail 94. As the piston pulls against rail 94 the movable portion of the wing assembly is lowered in relation to the fixed portion thereof as described above. If stand assembly 26a–26c is in its lowered position as shown in FIG. 1c, the cylinders eventually begin to lift the fixed portion of the wing assembly from the vehicle. At this point, the wing assembly is disengaged from retaining bracket 98 when pin assembly 99 (FIG. 5) is lifted therefrom.

To reinstall the wing assembly to the vehicle, the above procedure is reversed. That is, pin and bracket assemblies 99 and 98 are brought into alignment and piston 91 is retracted within cylinder 90. As a result, the fixed portion of the wing assembly (frame 108) is lowered into a secured position to the vehicle. Thereafter, the movable portion of the wing assembly is raised or lowered as desired to achieve proper elevation of the wing portions.

Wing stand 26c (which is a typical wing stand) includes an elongate member 70 having a load-bearing portion 71. Stand 26c is arranged to pivot about a pivot point 72 between a retracted position (FIG. 3) and a supporting position (FIG. 1c). Load-bearing portion 71 is broad enough to support the weight of the wing assembly without sinking substantially into the mud in the field in which the wing assembly is used.

(4) Pitch: The pitch of the wing assembly may be adjusted as shown by arrow 80. A cylinder 96 includes a piston 97 that may be extended to exert a bias against wing assembly base portion 68. One end of the cylinder is fixed to the vehicle; piston 97 is extended from or withdrawn into the other end of the cylinder to push or pull against wing assembly base portion 68.

The wing assembly is carried on bracket 98 by a pin 99, as discussed above (FIG. 5). Such arrangement is provided at either side of the wing assembly and vehicle and allows the pin to pivot about the bracket. When bias is exerted by piston 97 against rail 94, the pitch of wing assembly and wing portions 19 and 21 is adjusted, as shown by arrow 80. Pitch is adjusted when harvesting on an uphill or downhill slope to maintain the wing portions at a substantially vertical orientation. Thus, if the vehicle is operated on a downhill slope, piston 97 is retracted within cylinder 96. Likewise, a vehicle operated on an uphill slope, has piston 97 extended from cylinder 96. Two such piston and cylinder assemblies are provided. Both wing portions are adjusted for pitch simultaneously—not independently, as for pivot and rake.

Various controls are located about the vehicle and the wing assembly. One control assembly 100a is shown on the deck of the vehicle. Such controls may be used to operate the vehicle or to operate the vehicle chain drive 23a and 23b. A rear chain drive includes a shaft 102, a drive wheel 103 for chain 23a, and a drive motor 104. In the preferred embodiment of the invention, drive motor 104 is a hydraulic motor operated from the diesel powered hydraulic system. Shaft 102 also is coupled to a drive wheel (not shown) for chain 23b. In this way the chains are operated in synchronicity.

A second control assembly 100b is shown that may be used to operate the various hydraulic portions of wing assembly 16. Thus, a worker may readily adjust wing portion rake, elevation, and pitch as the vehicle is moved through the field during the harvest and as harvest conditions change with the contour of the field. In this way, harvest efficiency is maintained at a maximum by providing a constant work conditions for workers who are loading the boxes on the wing portions.

Figure 10A:
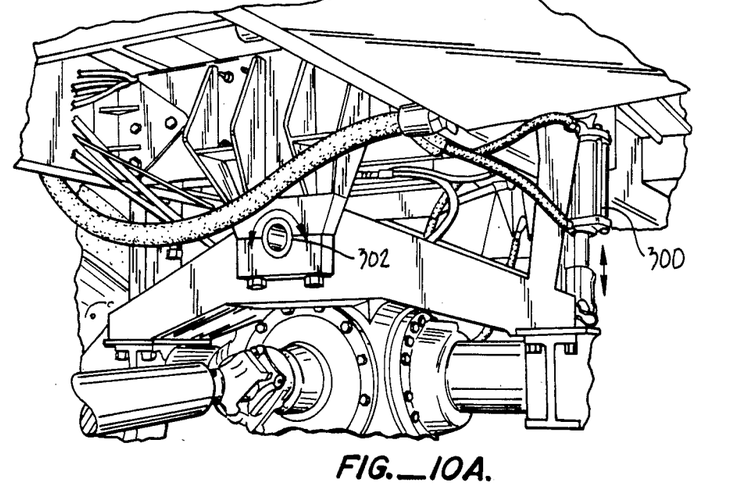
FIGS. 10A and 10B are perspective views of the hydraulic cylinders and trunion axle mount for actuating the leveling system attached to the vehicle of this invention.
Figure 10B:
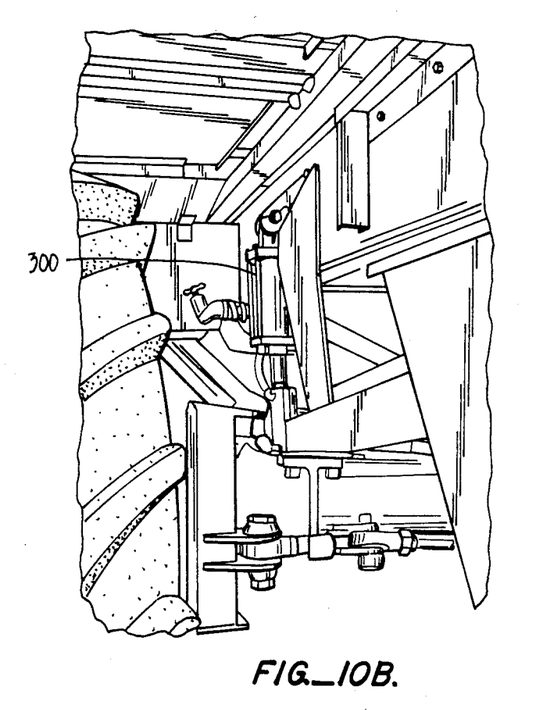

The vehicle can be provided with a leveling system as illustrated in FIG. 10. This system is preferred because changes in elevation of the vehicle as it proceeds through the field can topple the palletized loads as well as unacceptably change the elevation of the harvesting wings as the vehicle proceeds.

The load leveling system is shown in its hydraulics in FIG. 10. The concept behind this system is to keep the load level while traveling along irregularly sloped or deep rutted fields or roads. The system consists of an electronic tilt-sensing box, a standard item of manufacture of the John Deere Company of East Moline, Illinois. This device (not shown) includes a spring-centered, solenoid operated directional control valve, a trunion-mounted ram 300, and a trunion 302 on each axle. The axles are mounted to on the bottom of the deck trunion 302.

The level controller includes a pendulum that swings back and forth from the tilting of the vehicle. On each side of the pendulum are limit switches that are wired to both coils of the solenoid operated control valve. When one of the switches is activated by the pendulum due to tilt of the vehicle, it operates the solenoid, which opens the valve, which in turn operates the trunion-mounted ram. When the pendulum swings back to the middle, it turns off the switch and solenoid and closes the valve and keeps the deck level. When the harvester is moving through the field, each axle follows the terrain, thus tilting the vehicle with swings the pendulum, activates either limit switch, which extends or retracts the ram keeping the deck level.

As described above, a pair of horns 106a and 106b are provided for locking the vehicle with another vehicle during load transfer. Horns 106a and 106b on one vehicle mate with sockets 60a and 60b (FIG. 4) on the other vehicle. Thus, when a load is to be transferred —for example when the vehicle is used as a shuttle—the shuttle vehicle is brought into abutment ( with the harvest vehicle from which the load is to be transferred. The horns of the first vehicle are engaged within the sockets of the other vehicle. Then and only then is proper alignment for load transfer achieved. A horn and socket arrangement is also provided by trailer 38, discussed below.

The shuttle and harvester vehicles rely on the nature of the chain drive and the fact that a loaded wooden pallet 20 (FIG. 6) is readily grabbed by protruding upper surfaces of chain 23a (or 23b) to become embedded therein. A pallet embedded in chain 23a (or 23b) does not move unless the chain is driven. Thus, friction is provided as necessary because the conditions encountered in a field are likely to dislodge a load from the vehicle. However, rollers 37 are provided to help carry the loaded pallet across the deck and thus maintain a proper clearance between the deck and the pallet (shown by arrows 43a and 43b in FIG. 6).

Figure 7:
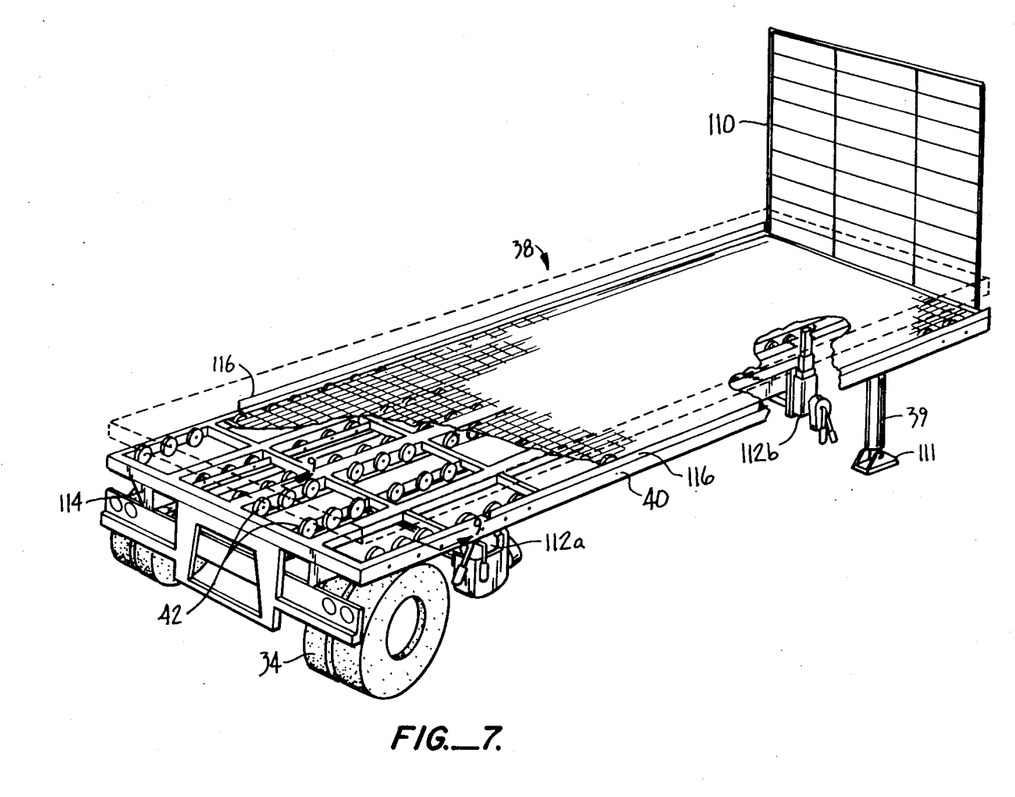
FIG. 7 is a perspective view of a trailer showing an elevated trailer bed position in phantom.

Trailer 38 is shown in perspective view in FIG. 7. The trailer includes a rear set of wheels 34 and rests on a landing gear 39 and a landing gear pad 111. The trailer is operated with a fifth wheel tractor such as tractor 48 (FIG. 1d). In other embodiments of the invention, other types of trailers may be used including those having front and rear wheel sets.

A load is transferred from a shuttle vehicle to trailer 38 when trailer bed 40 is in an elevated position (shown in phantom in FIG. 7). The elevated trailer position compensates for the extra large wheels with which the shuttle vehicle is provided to give the vehicle large ground clearance when in the field. Trailer bed 40 may be raised or lowered by linear drives lowering 112a and 112b. The drive used to raise and lower the bed is the same type of drive used to raise and lower the trailer landing gear. However, the drive is operated in reverse such that the bed is raised and lowered, rather than a landing gear. Such drives are well known and may be provided with manual and/or powered motive means. Although two such drives are shown on one side of the trailer, two such drives also are provided on the other side of the trailer to give the bed four lift points. In this way, the bed is raised and lowered evenly, without tilting that could displace the load.

Figure 8:
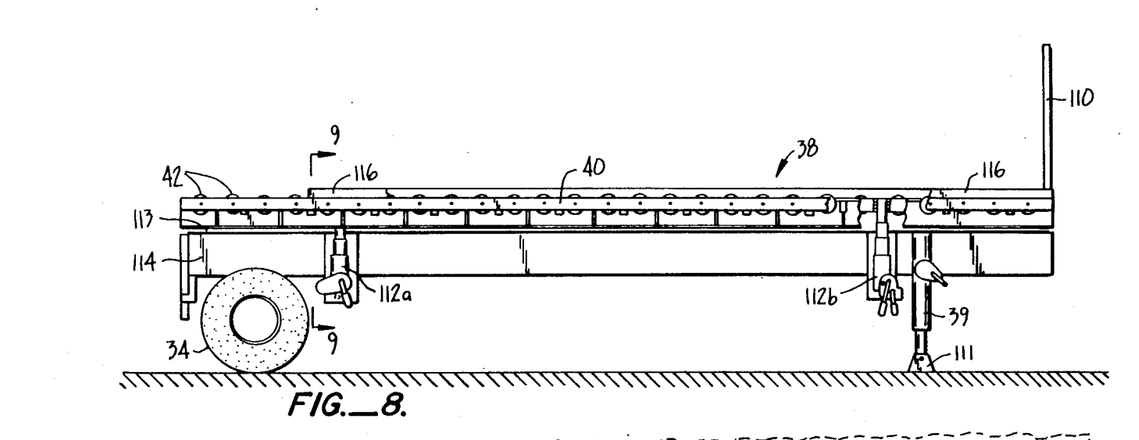
FIG. 8 is a side elevational view of the trailer.
Figure 9:
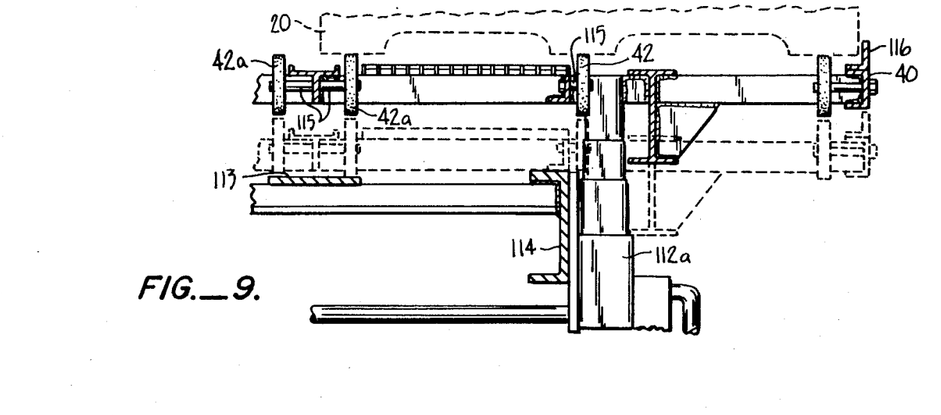
FIG. 9 is a cross-sectional view of the trailer taken along line 9—9 in FIGS. 7 and 8.

A side elevational view of the trailer is shown in FIG. 8. As the load is transferred across the trailer bed it rides on rollers 42. A cross sectional view taken along line 9—9 in FIGS. 7 and 8 is shown in FIG. 9. Bed 40 is movable in relation to frame 114. Rollers 42 provide a smooth, frictionless surface across which pallet 20 may be moved without significant effort or resistance. In contrast to the shuttle mechanism in which the pallets are moved by a powered chain drive, there is no power provided to rollers 42. Rather, pallets are pushed from the shuttle vehicle onto and across the trailer bed by the shutter vehicle chain drive.

To prevent shifting of the load during transport an abutment surface 113 is provided to capture and hold rollers 42a and thereby maintain the pallets in position. The pallets are prevented from shifting from side to side by a guide edge 116. The guide edge is particularly useful for maintaining the load in proper alignment along the trailer bed when transferring it from the shuttle vehicle. When the trailer bed is in the elevated position, rollers 42a are free to rotate about their shafts 115. When the bed is in the lowered position, rollers 42a are captured, as described above. The load is also maintained in position on the trailer bed by a gate 110.

Accordingly, a shuttle/harvester vehicle and specialized trailer are provided. The vehicle may be operated either as a shuttle, as a harvester, or in combination as a shuttle and a harvester. Although a trailer is provided, the trailer is not absolutely necessary when using the vehicle. Rather, docking facilities may be provided at a proper height for receiving the load from the shuttle. Key aspects of the present invention include its versatility and adaptability to the rigorous demands of harvesting wet soil crops, such as broccoli and cauliflower, and its maximization of worker and machinery efficiency. The present invention eliminates idle man-hours and redundant equipment.

By providing identical vehicles with multiple functions, replacement of vehicles that have broken down becomes a trivial matter. The detachable wings allow the substitution of vehicles upon the occurrence of such breakdowns. Heretofore, a harvest would be interrupted if a harvest vehicle broke down at a critical point. The present invention allows the ready replacement of damaged or defective vehicles without such interruptions.

Additional benefit is provided by having a self-powered vehicle. Previous harvesting equipment has relied on the use of tractors to draw a vehicle through a field until a load was accumulated. Thereafter the entire vehicle was towed from the field unloaded and then towed back to the field. The present invention automates this procedure in an efficient and novel manner.

We claim:

1. A harvest vehicle for use as a prime mover for moving harvesting apparatus through a field or as a shuttle vehicle for transporting product from a point of harvest in a field to a point of transport adjacent the field, said vehicle comprising in combination:
   a vehicle platform forming a flush, upwardly exposed deck for said vehicle for retaining pallets of harvested product on said deck;
   a conveyor mounted flush to the deck of said vehicle for conveying said pallets of harvested product from and over the rear end of the deck of said vehicle across said vehicle and to and over the front end of said vehicle;
   an operator station recessed below the deck of said vehicle in said conveyor path to permit said pallets of harvested product to be conveyed over said operator station; and
   gathering means for engaging a similar vehicle having a flush deck to enable the flush decks of said harvest vehicles to be engaged end to end at the same level whereby said conveying means can transfer cargo to and from said similar vehicle, said gathering means being located at the forward and rear ends of said harvest vehicle.

2. The harvest vehicle of claim 1 and wherein said vehicle includes a second operator station mounted to the side of said vehicle operating said vehicle from the side thereof.

3. The invention of claim 1 and wherein said gathering means for engaging a similar vehicle includes male gathering surface at one end of said vehicle and female gathering surface at the other end of said vehicle, said respective male and female gathering surface being disposed for moving said decks into the same elevation from initial engagement in differing elevations.

4. The invention of claim 1 and including a barrier mounted between said operator station and the rest of said deck, said barrier movable between an open position wherein said retained pallets conveyed to a closed position wherein said retained pallets are maintained on said deck away from said operator station.

5. In combination a harvest vehicle for use as a prime mover for moving harvesting apparatus through a field; a shuttle vehicle for transporting product from a point of harvest in said field to a point of transport adjacent said field; said harvest vehicle and said shuttle vehicle both including;
   a vehicle platform forming a flush, upwardly exposed deck for said vehicle for retaining pallets of the harvested product on said decks;
   a conveyor mounted flush to the deck of both said vehicles for conveying said pallets of harvest product from and over the rear end of the deck of each of said vehicles across said vehicles and to and over the front end of said vehicles;
   an operator station on each said vehicles recessed below the deck of said vehicles in said conveyor path to permit pallets of harvested product to be conveyed over said operator station; and
   gathering means on both said vehicles for engaging the other of said vehicles to enable the flush decks of said vehicles to be engaged end to end at the same level whereby said conveying means can transfer cargo between said vehicles.

6. The combination of claim 5 and including a roadside trailer;
   said roadside trailer including gathering means for engaging one end of said shuttle vehicle to permit conveyance of cargo from the deck of said shuttle vehicle to said roadside trailer.

7. The combination of claim 5 and wherein said roadside trailer and said shuttle vehicle have means for moving their respective decks relative to one another to permit conveyance of palletized harvested vegatables between said trailer and said shuttle vehicle.

* * * * *